(No Model.)

D. S. REGAN.
POWER TRANSMITTER.

No. 558,107.

Patented Apr. 14, 1896.

2 Sheets—Sheet 1.

Attest.
Edw. Durell
A. W. Bayald

Inventor.
Daniel S. Regan
per Fred D. Tasker
Atty.

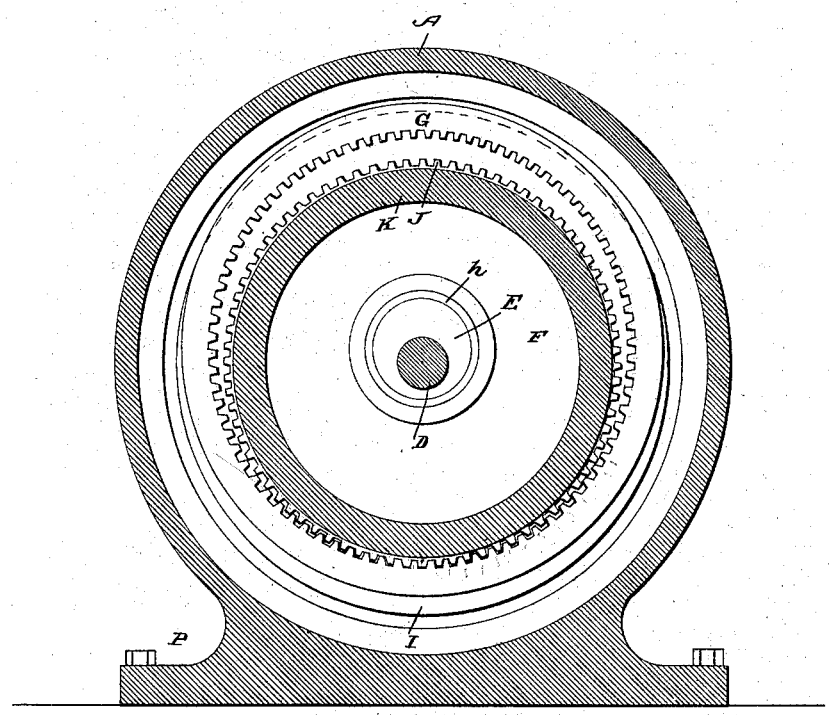

UNITED STATES PATENT OFFICE.

DANIEL S. REGAN, OF SAN FRANCISCO, CALIFORNIA, ASSIGNOR TO THE POWER TRANSMITTER COMPANY, OF JERSEY CITY, NEW JERSEY.

POWER-TRANSMITTER.

SPECIFICATION forming part of Letters Patent No. 558,107, dated April 14, 1896.

Application filed July 13, 1895. Serial No. 555,904. (No model.)

*To all whom it may concern:*

Be it known that I, DANIEL S. REGAN, a citizen of the United States, residing at San Francisco, in the county of San Francisco and State of California, have invented certain new and useful Improvements in Power-Transmitters; and I do hereby declare the following to be a full, clear, and exact description of the invention, such as will enable others skilled in the art to which it appertains to make and use the same.

These improvements refer to a power-transmitter for transferring motion from one point to another at a reduced speed or at an increased speed, and, if desired, in a reverse direction, the same being applicable to various kinds of machines, such as are used in shops of various kinds, or being applicable to other kinds of mechanism too numerous to mention.

The invention has for its object the adaptation of a new and improved form of reduction-gearing for use in the connection specified, so that the high speed of a driving-shaft, which may be the armature-shaft of an electric motor or some other high-speed prime mover, may be reduced to a lower speed in the driven element when rotating at a given ratio, the same depending upon the proportions of the different gears and their relation and combination relatively to each other, or so that a low-speed prime mover may be used to drive a high-speed dynamo. Said novel form of reduction-gearing just referred to has been made the subject of another application for Letters Patent, filed June 7, 1894, Serial No. 513,739. The invention set forth and claimed in the present application is, therefore, a carrying forward and adaptation of the invention described in said other application.

The invention therefore consists, essentially, in the construction, arrangement, and combination of parts, substantially as will be hereinafter described, and then more particularly pointed out in the ensuing clauses of claim.

Referring to the accompanying drawings, I have illustrated therein one preferred embodiment of my invention, the same being sufficient to explain the principles thereof and enable those skilled in the art to make and use the invention, and it will be understood that the details of construction and arrangement of parts may be varied to suit the exigencies of different cases without departing from the spirit of my invention.

Figure 2:
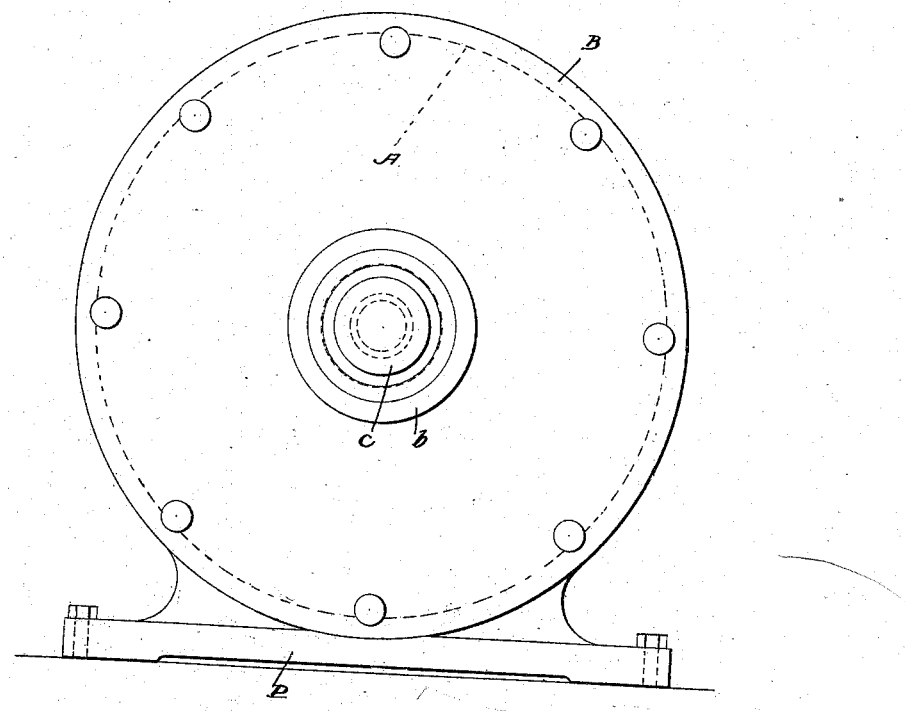
Figure 1:
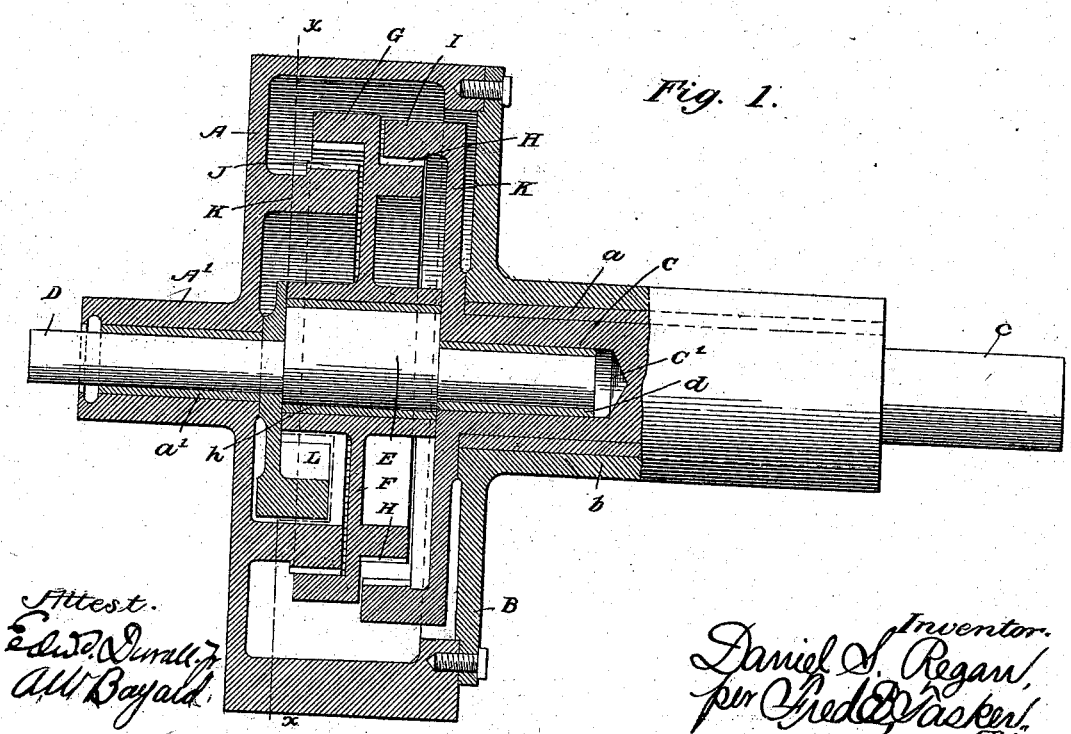

In the drawings, Figure 1 is a vertical cross-sectional view of my improved power-transmitter with certain parts shown in elevation. Fig. 2 is a side elevation of the same. Fig. 3 is a cross-section on the line $x\ x$ of Fig. 1.

Similar letters of reference designate corresponding parts throughout the different figures of the drawings.

A designates a circular casing or chamber, which is mounted in a stationary situation upon some suitable bed-plate P. I denominate said circular casing an "oil-casing," because it is adapted to contain a certain amount of lubricating material, and since a gearing mechanism is located inside of casing A this gearing will operate within the lubricant and hence run noiselessly, besides being kept thoroughly oiled. The stationary casing A is provided at its central point on one side with a horizontal shaft-bearing A', which is preferably integral with the casing A. The opposite side of casing A is closed by means of a circular plate B, serving as a cover for the casing, said plate being secured in position by means of screws, bolts, or other fastening devices and being removable, when desired, in order to allow access to the interior of casing A.

The cover-plate B is provided at its central point with a horizontal integral stationary shaft-bearing $b$, the axis of which is in alinement with the axis of the other shaft-bearing A', although the bearings themselves may be of different sizes or diameters, if preferred. Accordingly it will be seen that the stationary circular casing A, besides acting as an inclosing chamber to receive a gear mechanism and surround the same with lubricating material, serves also to provide a bearing on each of its sides for sustaining and holding the driving-shaft and the driven shaft, one or both.

D denotes a shaft, which may be a driving-shaft or a driven shaft, as the case may be, which is supported horizontally within the shaft-bearing A', a bushing $a'$ being preferably interposed between the shaft D and the bearing A'. Within the other shaft-bearing b is situated a shaft C, which may be a driving-shaft or a driven shaft, as the case may be, and between which and the bearing b is preferably interposed a sleeve or bushing a, as clearly shown in Fig. 1. The shaft C extends entirely through the bearing b, if preferred, and may be made considerably longer and of considerably greater diameter than the bearing A, and the end of the shaft C which projects beyond the bearing b is preferably reduced in diameter, as at c, so as to correspond more nearly with the diameter of the shaft D. Furthermore, it must be observed that the shaft C is formed with a recess C', which provides a sort of step or cup bearing, and in this recess enters loosely and revolubly the end of the shaft D, there being, preferably, a bushing d interposed between the shaft D and the wall of the recess C', as shown in Fig. 1.

On the shaft D, at a point centrally within the stationary casing and standard, is an eccentric E. On this eccentric, revolving loosely and driven thereby, is a combined external and internal gear-wheel, consisting of a web F, on one side of which is an internal gear-wheel G and on the other side of which is an external gear-wheel H. The internal gear-wheel G engages the teeth of an external gear-wheel J, which is secured rigidly to the interior wall of the casing A or to a flange K, integral with said interior wall of the casing A. The external gear-wheel H of the combined internal and external gear engages the teeth of an internal gear-wheel I, which is attached to or is made integral with a plate K, that is integral with the recessed shaft C, above described. Furthermore, on the shaft D, preferably at a point between the bearing A' and the eccentric E, is placed a suitable counterbalance L, the function of which is to secure a uniformity of motion and speed when the mechanism is running at a very high velocity; also it is to be observed that I preferably interpose a bushing h between the eccentric E and the combined internal and external gear-wheel.

In speaking of the operation of my improvements it will be understood that power may be applied to the shaft D, in which case shaft D will be the driving-shaft and shaft c the driven shaft, or power may be applied to the shaft c, in which case shaft c will be the driving-shaft and shaft D will be the driven shaft.

When power is applied to the shaft D, the result will be as follows: As the shaft D revolves, the fixed eccentric E thereon will actuate the combined internal and external gear-wheel, which, as we have seen, engages the stationary external gear-wheel on the interior of the stationary casing and standard A, and inasmuch as the combined internal and external gear-wheel likewise engages the teeth of the internal gear-wheel I, which because of its construction moves in unison with the driven shaft c, the result will be that the driven shaft c will be reduced in speed below the rate of rotation of the driving-shaft D and will revolve in the same direction, the gearing which I have described effectuating this result in the most approved and satisfactory manner. When c is the driving-shaft and power is applied thereto, the same operation of the gearing will take place and the shaft D will have its speed increased in consequence above the speed of shaft c.

Having thus described my invention, what I claim as new, and desire to secure by Letters Patent, is—

1. In a power-transmitter, the combination of a stationary oil-tight casing and standard having shaft-bearings on the opposite sides thereof, a driving-shaft supported in one of said bearings, an ecentric fixed on said shaft and revolving therewith, a combined external and internal gear-wheel revolving upon and driven by the eccentric, a driven shaft supported in the other shaft-bearing and having a recess in one end receiving the driving-shaft, a gear-wheel on said driven shaft engaging one of the gears of the combined gear-wheel, and a stationary gear-wheel on the interior of the stationary casing engaging the other one of the gears of the combined gear-wheel, substantially as described.

2. In a power-transmitter, the combination of the stationary oil-tight casing and standard having shaft-bearings on the opposite sides thereof, a driving-shaft supported in one of said bearings, an eccentric fixed on said shaft and revolving therewith, a combined external and internal gear-wheel revolving upon and driven by the eccentric, a driven shaft supported in the other shaft-bearing and receiving the driving-shaft in one end thereof, a gear-wheel on said driven shaft engaging the external gear of the combined gear-wheel, and a stationary external gear-wheel on the interior of the casing engaging the internal gear of the combined gear-wheel, substantially as described.

In testimony whereof I affix my signature in presence of two witnesses.

DANIEL S. REGAN.

Witnesses:
OSCAR W. WHITE,
FRED E. TASKER.